United States Patent
Fan et al.

(10) Patent No.: US 7,684,084 B2
(45) Date of Patent: Mar. 23, 2010

(54) MULTIPLE DIMENSIONAL COLOR CONVERSION TO MINIMIZE INTERPOLATION ERROR

(75) Inventors: Zhigang Fan, Webster, NY (US);
Martin S. Maltz, Rochester, NY (US);
Lalit Keshav Mestha, Fairport, NY (US); Yao Rong Wang, Webster, NY (US); Alvaro E. Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 317 days.

(21) Appl. No.: 11/860,631

(22) Filed: Sep. 25, 2007

(65) Prior Publication Data

US 2009/0080041 A1   Mar. 26, 2009

(51) Int. Cl.
*H04N 1/60* (2006.01)
*G03F 3/00* (2006.01)
*G06K 9/00* (2006.01)

(52) U.S. Cl. .................. 358/1.9; 358/518; 358/3.23; 358/504; 358/525; 382/162; 382/167

(58) Field of Classification Search .................. 358/1.9, 358/529, 518, 3.23, 1.1, 1.5, 1.6, 1.12, 1.13, 358/1.14, 1.16, 504, 525; 382/162, 167; 347/19
See application file for complete search history.

(56) References Cited

U.S. PATENT DOCUMENTS

| 5,305,119 | A | 4/1994 | Rolleston et al. |
|---|---|---|---|
| 5,416,613 | A | 5/1995 | Rolleston et al. |
| 5,483,360 | A | 1/1996 | Rolleston et al. |
| 6,236,474 | B1 | 5/2001 | Mestha et al. |
| 6,281,984 | B1 * | 8/2001 | Decker et al. ............ 358/1.9 |
| 6,335,800 | B1 | 1/2002 | Balasubramanian |
| 6,480,299 | B1 * | 11/2002 | Drakopoulos et al. ...... 358/1.9 |
| 6,532,081 | B1 | 3/2003 | Cecchi et al. |
| 6,625,306 | B1 | 9/2003 | Marshall et al. |
| 6,636,628 | B1 | 10/2003 | Wang et al. |
| 6,873,432 | B1 | 3/2005 | Thieret |
| 6,934,053 | B1 | 8/2005 | Mestha et al. |
| 7,069,164 | B2 | 6/2006 | Viturro et al. |
| 7,199,900 | B2 | 4/2007 | Ogatsu et al. |
| 7,505,625 | B2 * | 3/2009 | Haikin .................... 382/167 |
| 2007/0229574 | A1 * | 10/2007 | Kaneko et al. ............ 347/19 |

OTHER PUBLICATIONS

Balasubramanian, Raja. "Color Transformations for Printer Color Correction." *IS&T and SID's 2nd Color Imaging Conference: Color Scienc, Systems and Applications* (1994). pp. 62-65.

* cited by examiner

*Primary Examiner*—Charlotte M Baker
(74) *Attorney, Agent, or Firm*—Oliff & Berridge PLC (57) ABSTRACT

Linear transformations of L*a*b* color space are provided to minimize interpolation errors when performing multi-dimensional color space conversions involving lookup tables. Methods are provided for linear transformations (e.g., rotation and shear) to substantially fit the sampling grid to a given printer gamut.

19 Claims, 5 Drawing Sheets

MULTIPLE DIMENSIONAL COLOR CONVERSION TO MINIMIZE INTERPOLATION ERROR

BACKGROUND

This disclosure generally relates to color digital imaging on machines, such as printers and copiers and specifically relates to color conversion, color correction, and color calibration and/or characterization.

In today's business and scientific worlds, color has become essential as a component of communication. Color facilitates the sharing of knowledge and ideas. Consequently, companies involved in the development of digital color print engines are continuously looking for ways to improve the accuracy and total image quality of their products. One of the elements that affects image quality is the ability to consistently and accurately produce color documents.

Figure 1:
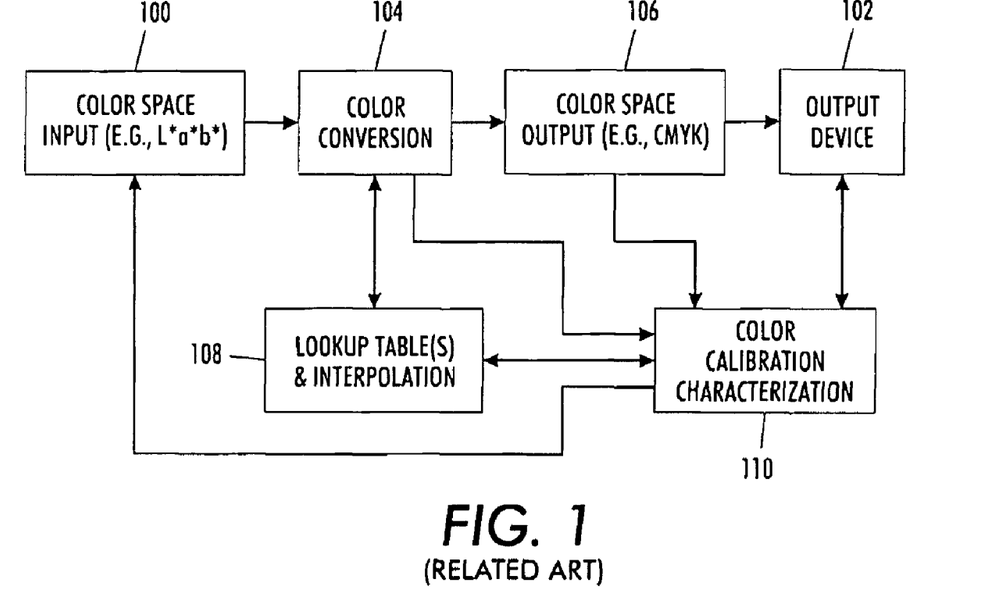
FIG. 1 illustrates an exemplary embodiment of a system and method for multi-dimensional color conversion in the related art.

FIG. 1 illustrates an exemplary embodiment of a system and method for multi-dimensional color conversion in the related art. The generation of color documents may be thought of as a two step process. First, input signals 100 representing a desired image are produced by a scanner, computer, copier, or other image-generating device. Second, a printer, copier, or other output device 102 receives the input signals 100, a color conversion component 104 converts the input signals 100 to output signals 106 and the output device 102 generates the image.

One problem with generating color documents is that output devices 102 have different capabilities and available colorants may be uniquely defined for each output device. As a result, the generated color document may have different colors when printed on different output devices. To overcome this problem, each output device 102 may be provided with a lookup table (LUT) 108 for converting input signals 100 into proper output signals 106.

A lookup table 108 converts input signals 100 into output signals 106 by performing a colorimetric match using the color conversion component 104. Typically, each printer can print a limited range of colors as a faithful reproduction of the intended color. However, some input signals 100 may be outside the range of printable colors on a particular printer. A printer gamut is the range of colors available for printing on a printer. Colors within a printer gamut may be fairly accurately reproduced, while colors outside of the printer gamut may not.

Color conversion involves a transformation of a desired color from a device independent color space to a device dependent color space. A device independent color space defines a color in terms of a standard color space or a colorimetric specification. Colors defined in a device independent color space may be more accurately reproduced on various different devices, such as printers. A common choice for a device independent color space is a luminance-chrominance space, denoted generically as $LC_1C_2$. A common example of a luminance-chrominance space is CIE L*a*b*. Some other standard color spaces are, for example, CIE XYZ, SMPTE linear RGB, SMPTE gamma-corrected RGB, YES and Photo Ycc. A device dependent color space defines a color in terms specific to the device. For example, a device dependent color space may be defined by a coordinate system defining color values as point coordinates, where each axis represents one of the colors (e.g., cyan, magenta, yellow, and black (CMYK)) that are within a gamut of a particular printer. The color conversion transformation in the color conversion component 104 is commonly implemented as a lookup table 108. Each input 100 in the device independent color space is characterized to an output signal 106 in the device dependent color space. Thus, this characterization maps device independent coordinates to device dependent coordinates.

Color correction involves inverting the colorimetric characterization and obtaining another transformation from device independent coordinates to device dependent coordinates. One way to test the efficacy of a color correction system is to examine how well it inverts the colorimetric characterization of an output device 102, such as a printer. To do so, test data may be printed and measured to obtain colorimetric data in true L*a*b* values. The true L*a*b* values are passed through the colorimetric characterization of an output device 102 and the color correction transformation to obtain estimated values.

Color calibration and/or characterization of an output device (e.g., printer) 102 involves the process of finding a set of signals to send to the printer to obtain a desired color. The desired color is described in device independent color space and the signals to send to the printer are described in device dependent color space. A complete color calibration and/or characterization transforms the device independent color descriptions into device dependent color descriptions such that the resultant output of developer materials (e.g., toner) on a substrate (e.g., piece of paper) produces the desired color. The final stage of color calibration and/or characterization involves establishing a color correction transformation. This may be done by printing and measuring patches distributed throughout the color space. The patches are used to build a multi-dimensional dimensional lookup table 108 that is used with interpolation. There are many known methods of interpolation, including tri-linear, tetrahedral, polynomial, linear, and others.

Lookup tables 108 may be stored in memory associated with a printer, which may be read-only memory (ROM), random-access memory (RAM) or any storage device. A lookup table 108 typically relates an input color space for input color signals 100 to an output color space for output color signals 106 and is commonly multi-dimensional, depending on the color spaces. For example, a lookup table with a three-dimensional output may be used for RGB output color space while a four-dimensional lookup table may be used for CMYK color space.

RGB color space, which is commonly used for scanners or monitors, may be defined as a three-dimensional space. In the RGB three-dimensional space, each of the three axes radiating from the origin define red, green and blue. The color black is located at the origin of a three-dimensional coordinate system (0,0,0), and the color white is located at the maximum of the coordinate system, which if color values are expressed in 8-bit integers (i.e., a whole number between 0 and 255) is located at (255, 255, 255). A similar coordinate system may be constructed for a printer.

CMYK color space, which is commonly used for printers, may be defined as a three- or four-dimensional space. In the CMY three-dimensional space, each of the three axes radiating from the origin define cyan, magenta and yellow. Black is usually added separately. In the CMYK four-dimensional space, each of the four axes define cyan, magenta, yellow and black.

L*a*b* values are independent color space representations of the CIE (Commission Internationale de L'éclairage) for color standards. L* defines lightness, a* corresponds to the red/green value and b* denotes the amount of yellow/blue.

The selection of the input color space in color conversion lookup tables 108 is a factor in minimizing interpolation error. Conventionally, the input color space is usually L*a*b* or RGB. On the one hand, a conventional L*a*b*-based lookup table 108 does not fit the printer gamut very well. As a result of not fitting well, some colors may not be printed accurately. On the other hand, a conventional RGB-based lookup table 108 does not offer uniform sampling grid spacing. Non-uniform grid spacing may also result in some colors not being printed accurately. Both the fit to the printer gamut and the degree of uniformity of the sampling grid spacing in a lookup table 108 affect interpolation error.

SUMMARY

Exemplary embodiments include a method of generating a lookup table for color conversion. A transform matrix is computed for an input color space (e.g., L*a*b*). A set of sampling grid points within the input color space are determined using the transform matrix. The sampling grid points substantially fit a printer gamut with substantially uniform spacing. The lookup table is stored with the sampling grid points. An optimization is applied by minimizing an objective function. The sampling grid points are determined using a set of lower and upper bounds associated with the transform matrix. The inverse of the transform matrix is multiplied by each color value in the printer gamut to produce a vector. A set of upper and lower bounds are updated based on the vector. The transform matrix is computed using a set of axes defining the printer gamut as basis vectors. Color conversion is performed using the lookup table and interpolation. Another exemplary embodiment is a computer readable medium storing instructions for perform this method.

Another exemplary embodiment is a system for color conversion including a color conversion component, a storage device and an output device. The color conversion component converts input color values in a device independent color space to output color values in a device dependent color space. The storage device is coupled to the color conversion component and stores a lookup table. The lookup table provides color values in device dependent color space that is indexed by sampling grid points in the device independent color space. The sampling grid points substantially fit a printer gamut and have substantially uniform spacing between the sampling grid points. The output device is coupled to the color conversion component and has the printer gamut. The output device receives the output color values and produces a color image. The system may also include a color correction component and a color calibration and/or characterization component. The color correction component is coupled to the output device and the color conversion component. The color correction component inverts a colorimetric characterization of the output device and calculates an interpolation error. The color calibration and/or characterization component is coupled to the output device and the color conversion component. The color calibration and/or characterization component generates or updates the lookup table.

EMBODIMENTS

Generally, colors for a device are represented in one of two ways, as points in a device independent color space or as points in a device dependent color space. To illustrate, most color display monitors, such as, for example, color computer monitors, display colors in a three-dimensional red/green/blue (RGB) color space. That is, the amount or value of red, green, and blue in a color define a point in a coordinate system where each axis represents red, green, and blue respectively. Using this technique, the color yellow, for example, is displayed on a color display monitor by combining a red image value of 100 percent red with a green image value of 100 percent green and a blue image value of zero percent (e.g., (255, 255, 0) for 8 bit values).

The RGB values associated with the particular colors for a color display monitor are usually device dependent. This means that the RGB values associated with a particular color to be viewed on a specific color display monitor, are unique to that specific color display monitor or, at least to that brand of color display monitor. Simply put, because RGB values are device dependent, if identical RGB values, such as, for example, (255, 255, 0) is displayed on two different color display monitors, the resulting yellow color displayed on the two different color display monitors will probably not appear exactly alike.

Unlike most color display monitors, most color marking devices use a cyan, magenta, yellow and black (CMYK) color space. Most color marking devices, such as, for example, color printers, print colors using device dependent terms. If identical CMYK values are printed on two different printers, the resulting color printed on the two different printers will probably not appear exactly alike.

The other way of representing colors is as points in a device independent color space. By representing colors in a device independent color space, consistent colors can be reproduced regardless of the type of device that is used to display or print the colors. For this reason, color reproduction generally starts with colors represented in a device independent color space, such as, for example, L*a*b*. For example, color descriptions in a page description language (PDL) may use L*a*b* representations. Among other advantages, L*a*b* space has the property that it is perceptually linear. Specifically, the color difference measured in L*a*b* correlates well with human perception. To convert or map such color descriptions in device independent color space (e.g., L*a*b* in a PDL file to be printed) to device dependent color space (e.g., CMYK for a printer) a model for color space transformations is used.

To provide accurate color matching between color display devices and color marking devices, various color matching techniques have been developed that use models to translate colors from one color space to another color space. These models usually are in the form of predetermined multi-dimensional lookup tables. The lookup tables, such as, for example, a multi-dimensional lookup table with inputs and outputs, translate colors from one color space to another color space, while attempting to maintain the translated color's perceived appearance. For example, if a user creates an image on a color display monitor and subsequently prints the created image without any color matching, the colors observed on the printed image may differ significantly from the colors observed on the color display monitor. However, if a color matching model is used, the discrepancies between the colors observed on the color display monitor and the colors observed on the printed image may be reduced.

Generally, to solve the problem of color matching, a printer inverse is produced for matching colors in color spaces. The printer inverse is used to interpolate between sampled multi-dimensional color data and is normally obtained for a particular color marking device by experimentation. The printer inverse is a lookup table that converts colors from one color space to another, such as, for example, from L*a*b* to CMYK. Such a L*a*b* to CMYK lookup table may be generated by measuring a printer forward transfer function between input color values and the corresponding color values in the printed images. Output color values in the printed images may be measured by a color sensor, such as, for example, a spectrophotometer. The forward transfer function may then be used to create the printer inverse.

Figure 2:
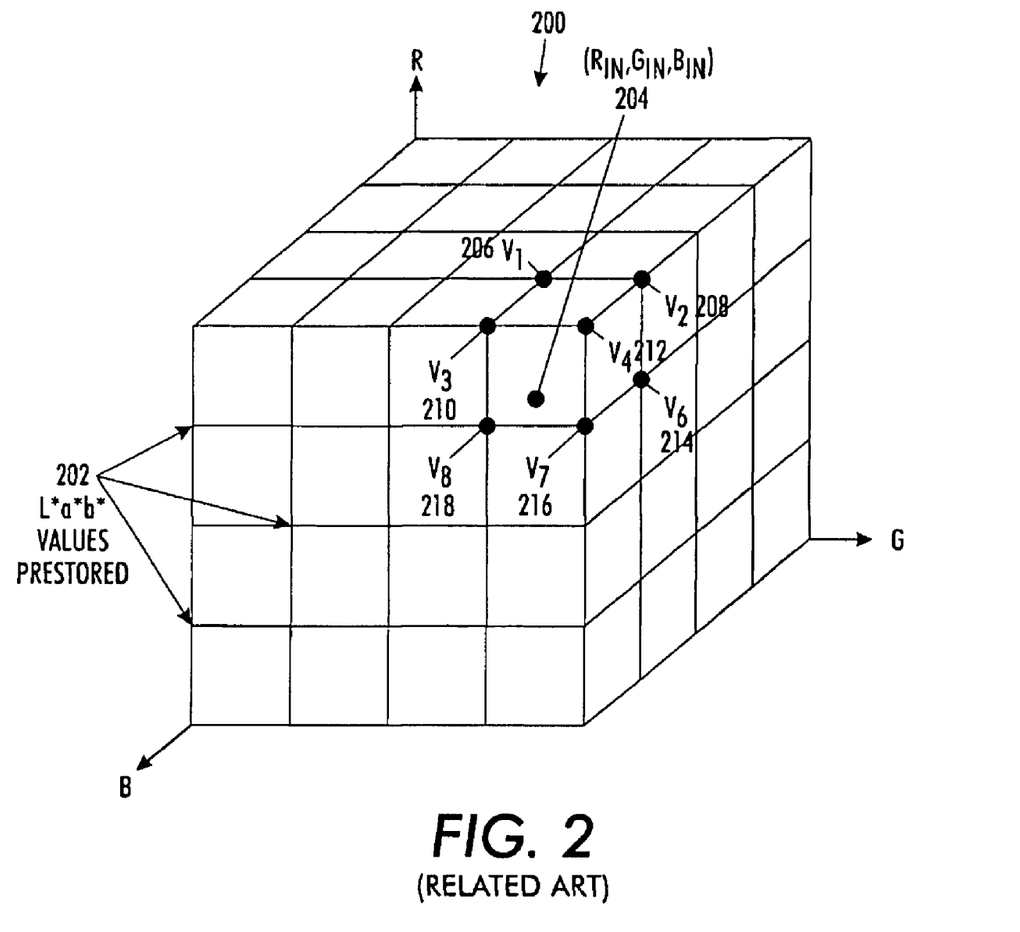
FIG. 2 illustrates a lookup table in the related art.

FIG. 2 illustrates a lookup table in the related art. In this example, the lookup table converts input RGB values into output L*a*b* values. A similar lookup table may be used to convert L*a*b* values into CMY values, RGB values into CMY values or any other three-dimensional values into corresponding three-dimensional values. A lookup table may have any number of input and output dimensions; however only a lookup table with a three-dimensional input may be envisioned as a cube, as in FIG. 2. This three-dimensional lookup table may be envisioned as a cube 200 having grid sampling points 202 and one corner at the origin of a coordinate system having three axes for the color values red, green and blue (RGB). Grid sampling points 202 are typically predetermined. Each grid sampling point 202 may be thought of as an index into the lookup table for retrieving the corresponding L*a*b* values stored in the lookup table. An input color 204 defined by point ($R_{IN}$, $G_{IN}$, $B_{IN}$) typically does not coincide exactly with the grid sampling points 202. Thus, the input color 204 is matched by finding a set of eight, vertices $V_1$ 206, $V_2$ 208, $V_3$ 210, $V_4$ 212, $V_5$ 214, $V_6$ 216, $V_7$ 218, $V_8$ 220, that are most closely adjacent to the input color 204. The eight vertices $V_1 \ldots V_8$ 206-220 form a cell containing the input color 204 ($R_{IN}$, $G_{IN}$, $B_{IN}$). The output color in L*a*b* values is approximated by interpolating between the L*a*b* values corresponding to the eight vertices $V_1 \ldots V_8$ 206-220 forming the cell containing the input color 204. The interpolation may be performing using any known method, such as trilinear, tetrahedral, or prism interpolation. The output obtained by interpolation may not be exactly the same as the exact output corresponding to the input. It is desirable to minimize the interpolation error, which is the difference between the interpolated output and the exact output. The interpolation error is often measured by ΔE. The interpolation error depends on the lookup table size, among other factors. A relatively larger lookup table with a denser sampling interval produces relatively smaller interpolation errors. However, a larger lookup table with a denser sampling interval also requires more storage space and more test patches for calibration and/or characterization. For a given printer and a given lookup table size, the selection of the input color space and the sampling strategy determine the interpolation error.

Exemplary embodiments include systems and methods of manipulating color conversion lookup table input color spaces to minimize the interpolation error. Color conversion maps a desired color from an input device independent color space (e.g., L*a*b* space) to an output device dependent color space (e.g., CMYK). Exemplary embodiments include transformations that rotate and shear a sampling grid to fit the printer gamut. Other embodiments may include various other linear transformations designed to minimize interpolation error. The linear transformation may be stored as a lookup table. One exemplary embodiment involves simple calculations, while another exemplary embodiment involves a process of iterative optimization that is more calculation intensive. However, both exemplary embodiments described below are efficient in that they substantially fit the printer gamut and produce substantially uniform sampling grids. Other embodiments may use more or less calculations and degrees of optimization, as desired.

Interpolation error represents the difference between input color values and output color values and may be used to judge the accuracy of interpolation. The interpolation error depends on the lookup table size, among other factors. A relatively larger lookup table with a denser sampling interval produces relatively smaller interpolation errors. However, a larger lookup table with a denser sampling interval also requires more storage space and more test patches for calibration/characterization. For a given lookup table size, the selection of the input color space and the sampling strategy determine the interpolation error.

Conventionally, there are mainly two methods of generating input for lookup tables for color conversion. The first one samples uniformly in the L*a*b* color space and the axes of the sampling grid are parallel to the L*, a* and b* axes, respectively. The second one samples based on RGB space or its linear transformations. These two methods of generating sampling grids for lookup tables for color conversion are illustrated in FIGS. 3A and 3B and contrasted below with an exemplary embodiment in FIG. 3C.

Figure 3A:
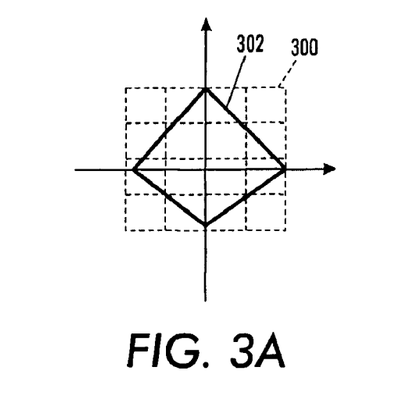
FIGS. 3A, 3B and 3C illustrate the fit of a conventional L*a*b* color space sampling grid, a conventional RGB color space sampling grid and an exemplary embodiment of a sampling grid to a given printer gamut, respectively.

FIG. 3A illustrates the fit of a conventional L*a*b* color space sampling grid 300 to a given printer gamut 302. In FIG. 3A, the conventional L*a*b* sampling grid 300 is represented by dashed lines and the printer gamut 302 is represented by solid lines. The nodes of the sampling grid 300 are inputs for a lookup table for color conversion from the L*a*b* color space to a device dependent color space (e.g., CMYK). Such a conventional L*a*b*-based lookup table results in many wasted cells that only contain out-of-gamut color. In FIG. 3 those wasted cells are the cells inside the sampling grid 300 but outside of the printer gamut 302. Thus, the conventional L*a*b*-based lookup table usually does not fit the printer gamut very well. Typically, sampling grids and printer gamuts are three-dimensional, while the figures show two-dimensions just for illustration.

Figure 3B:
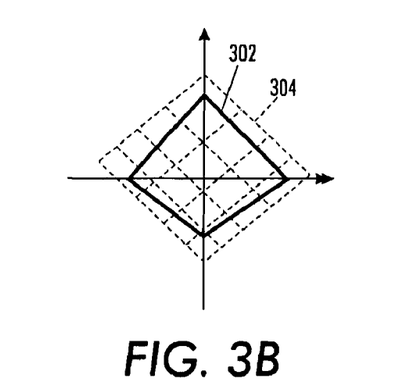

FIG. 3B illustrates the fit of a conventional RGB color space sampling grid 304 (dashed lines) to the given printer gamut 302 (solid lines). As can be seen in FIG. 3B, the RGB-based lookup table nearly fits the printer gamut 302. Nevertheless, the RGB-based lookup table does not offer uniform grid spacing, which is desired to minimize interpolation error. In FIG. 3B, some of the cells in the sampling grid 304 have varying sizes and shapes.

Figure 3C:
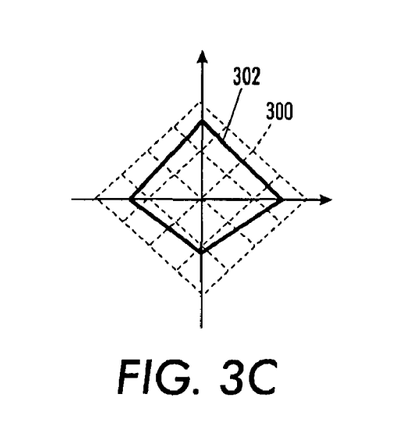

FIG. 3C illustrates the fit of an exemplary embodiment of a sampling grid 306 (dashed lines) to the given printer gamut 302 (solid lines). Exemplary embodiments include two lookup tables based on linear transformations of L*a*b* space. The linear transformations modify the sampling grid (e.g., by rotating and/or shearing) to more closely fit the given printer gamut. The exemplary sampling grid 306 shown in FIG. 3C substantially fits the printer gamut 302 and has a substantially uniform grid spacing.

Exemplary embodiments of the methods of generating sampling grids for lookup tables for color conversion may be characterized by the substantial homogeneity of the cell shape and size. Exemplary embodiments of the methods have at least two advantages. First, the homogeneity of the cell shape and size is, on the average, more efficient in terms of ΔE than heterogeneous cells, assuming that the magnitudes of the second order derivatives in the mapping function are homogeneous in the color space. Second, the ΔE value is uniform over the entire color gamut. Given the same average ΔE, it produces a small maximum error and 95 percentile error.

Figure 4:
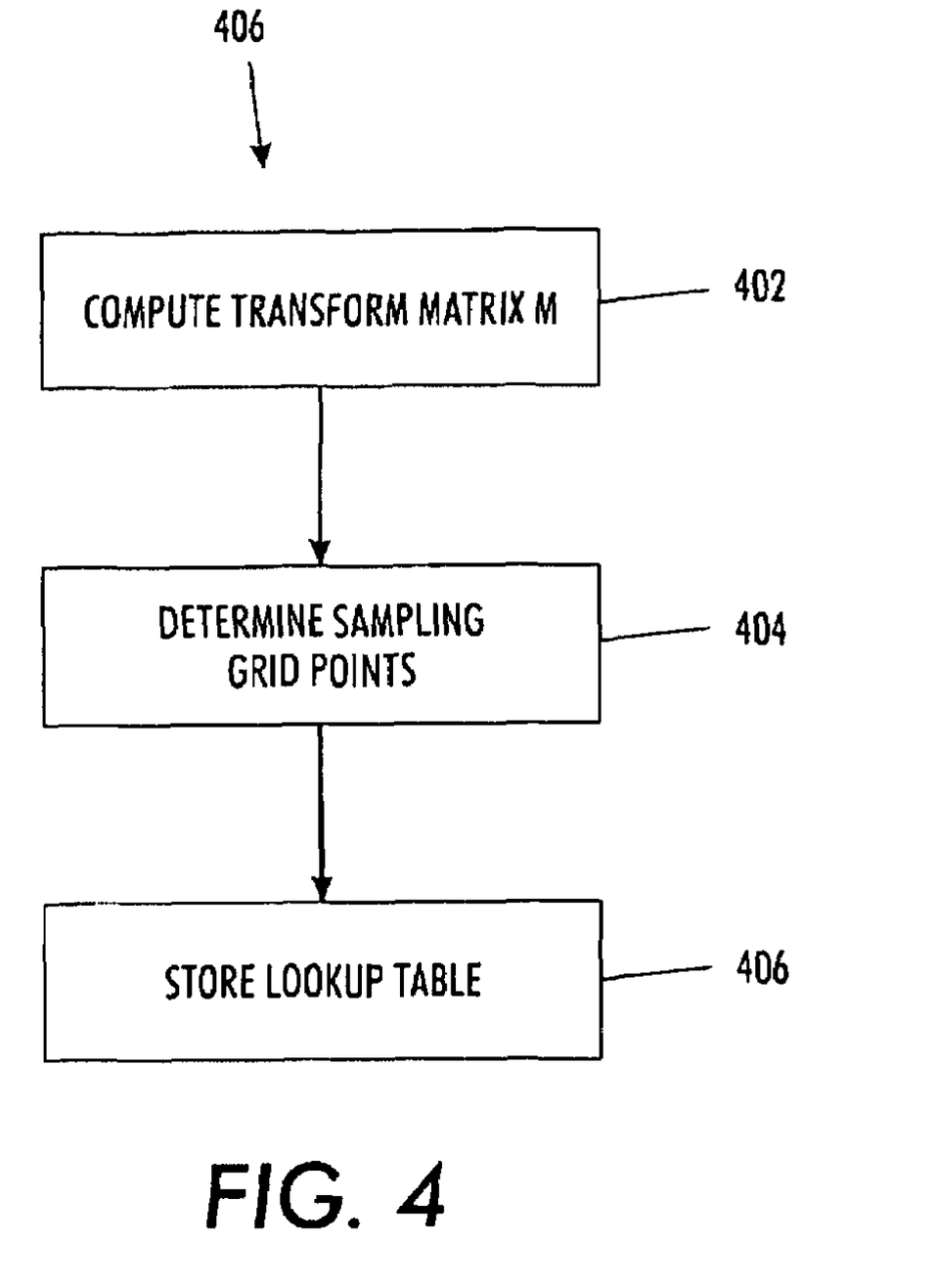
FIG. 4 illustrates a first exemplary method of multi-dimensional color conversion using linearly-transformed L*a*b* space.
Figure 5:
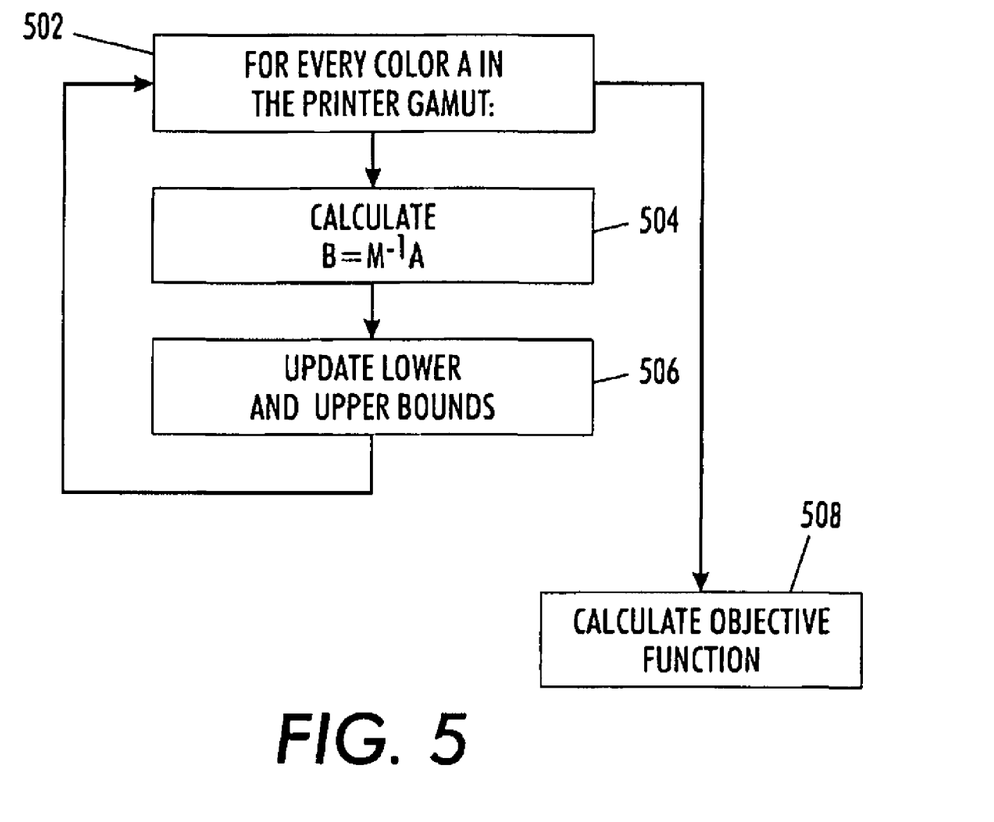
FIG. 5 illustrates a second exemplary method of multi-dimensional color conversion using linearly-transformed L*a*b* space, which is an optimized solution obtained by iterative optimization.

Lookup tables that have sampling grids that substantially fit the printer gamut and have a substantially uniform grid spacing may be created by two exemplary methods of multi-dimensional color conversion using linearly-transformed L*a*b* space, which are illustrated in FIGS. 4 and 5. The first method is a sub-optimal solution using simple calculations and is illustrated in FIG. 4. The second method is an optimized solution obtained by iterative optimization and is illustrated in FIG. 5. Both the first and second methods are efficient in that both of the resulting transforms, which are often stored as lookup tables, have substantially uniform sampling grids that fit the given printer gamut fairly well.

FIG. 4 illustrates the first exemplary method 400 of multi-dimensional color conversion using linearly-transformed L*a*b* space, which is a sub-optimal solution using simple calculations. Briefly, the first method 400 includes computing a transform matrix M at 402, determining a set of sampling grid points for a lookup table at 404, and storing the lookup table at 406.

First, the transform matrix M is computed. As the given printer gamut is roughly defined by cyan-white, magenta-white, and yellow-white axes, a transformation using these three axes as the basis vectors may significantly improve the fit of the sampling grid to the given printer gamut. Other embodiments may employ various other axes as the basis vectors, depending on the characteristics of the particular printer gamut. The transform may be represented by a 3×3 matrix, M, defined by equation (1) below.

$$M = [(c-w)/|(c-w)|, (m-w)/|m-w|, (y-w)/|y-w|] \quad (1)$$

In equation (1), c, m, y and w are column vectors that represent cyan, magenta, yellow and white colors in L*a*b* space, respectively. Each column is normalized to ensure its magnitude is one.

FIG. 5 illustrates the second exemplary method 500 of multi-dimensional color conversion using linearly-transformed L*a*b* space, which is an optimized solution obtained by iterative optimization. Briefly, the second method 500 includes performing a best fit optimization. The best fit optimization includes determining the following for every color, a, in the printer gamut at 502: calculating $b=M^{-1}a$ at 504, updating the lower and upper bounds at 506 and calculating an objective function at 508.

To achieve a best fit, an iterative searching method may be applied by varying the elements in the transform matrix, M. Other embodiments may employ various other optimization techniques, such as simulated annealing. The sub-optimal solution defined by equation (1) above may serve as an initial solution to be optimized by the second method. Other embodiments may start with various other initial solutions. Although in this example there are nine elements in the matrix, only six of them are independent, as the columns of M are normalized. The objective function for a particular M, Obj(M), may be calculated as follows.

1. Calculate $M^{-1}$.
2. Initialize $x_0 = +\infty$, $x_1 = -\infty$, $y_0 = +\infty$, $y_1 = -\infty$, $z_0 = +\infty$, $z_1 = -\infty$, where $\{x_0, y_0, z_0\}$ and $\{x_1, y_1, z_1\}$ are the variables that store the lower bounds and upper bounds, respectively, of the printer gamut in the transformed space for the three axes.
3. For every color a in the printer gamut, perform steps 4 to 10.
4. Calculate $b = M^{-1} a$.
5. If $(b[1] < x_0)$, then $x_0 = b[1]$, where $b[i]$ is the $i^{th}$ element of b.
6. If $(b[1] > x_1)$, then $x_1 = b[1]$.
7. If $(b[2] < y_0)$, then $y_0 = b[2]$.
8. If $(b[2] > y_1)$, then $y_1 = b[2]$.
9. If $(b[3] < z_0)$, then $z_0 = b[3]$.
10. If $(b[3] > z_1)$, then $z_1 = b[3]$.
11. $\text{Obj} = (x_1 - x_0)^2 + (y_1 - y_0)^2 + (z_1 - z_0)^2$.

The objective function, Obj, may be minimized by a simple search or by one of many standard optimization algorithms, such as the Newton-Raphson algorithm.

Once M is determined, the sampling grid points, g, may be calculated from the lower and upper bounds associated with M as follows.

1. $s = M [x_0, y_0, z_0]^T$, where superscript T indicates matrix/vector transpose.
2. $d = M [x_1-x_0, y_1-y_0, z_1-z_0]^T/N$, where N is the number of grid points in each dimension.
3. $g = s + [i \times d[1], j \times d[2], k \times d[3]]^T$, for i, j, k = 0. 1. 2. ... N-1.

Exemplary embodiments of the first and second methods may be simulated using a given printer gamut to evaluate the average ΔEs and compare them to those produced by conventional L*a*b* and RGB transforms. Experiments showed a substantial reduction in average ΔEs.

Exemplary embodiments may be implemented in many ways, such as, for example, software for a general purpose computer, a special purpose computer, as a programmed microprocessor or microcontroller and peripheral integrated circuit elements, as ASIC or other integrated circuit, a digital signal processor, a hardwired electronic or as a logic circuit, such as a discrete element circuit, a programmable logic device, such as a PLD, PLA, FPGA or PAL, or the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of generating a lookup table for color conversion, color correction and/or color calibration and/or characterization in a color imaging device, the method comprising:
    computing a transform matrix for an input color space;
    applying an optimization for at least one of color conversion, color correction or color calibration or characterization by minimizing an objective function;
    calculating a plurality of sampling grid points within the input color space using a set of lower and upper bounds associated with the transform matrix, the sampling grid points substantially fitting a printer gamut and having substantially uniform spacing between the sampling grid points; and
    storing a lookup table with the sampling grid points.

2. The method of claim 1, wherein the input color space is a device independent color space that is linearly transformed by the transform matrix to rotate and shear the grid points to fit the printer gamut.

3. The method of claim 2, wherein the optimization is performed by simple calculation.

4. The method of claim 2, wherein the optimization is iterative.

5. The method of claim 1, further comprising:
calculating an inverse of the transform matrix; and
multiplying the inverse of the transform matrix by each color value in the printer gamut to produce a vector.

6. The method of claim 5, further comprising:
updating a plurality of upper and lower bounds based on the vector.

7. The method of claim 6, further comprising:
computing the transform matrix using a set of axes defining the printer gamut as basis vectors.

8. The method of claim 7, further comprising:
performing color conversion using the lookup table and interpolation.

9. The method of claim 1, wherein the input color space is L*a*b*.

10. A computer readable medium storing instructions for performing a method of generating a lookup table for color conversion, color correction and/or color calibration and/or characterization in a color imaging device, the method comprising:
computing a transform matrix for an input color space;
applying an optimization for at least one of color conversion, color correction or color calibration or characterization by minimizing an objective function;
calculating a plurality of sampling grid points within the input color space using a set of lower and upper bounds associated with the transform matrix, the sampling grid points substantially fitting a printer gamut and having substantially uniform spacing between the sampling grid points; and
storing a lookup table with the sampling grid points.

11. The computer readable medium of claim 10, further comprising:
calculating an inverse of the transform matrix; and
multiplying the inverse of the transform matrix by each color value in the printer gamut to produce a vector.

12. The computer readable medium of claim 11, further comprising:
updating a plurality of upper and lower bounds based on the vector.

13. The computer readable medium of claim 12, further comprising:
computing the transform matrix using a set of axes defining the printer gamut as basis vectors.

14. The computer readable medium of claim 13, further comprising:
performing color conversion using the lookup table and interpolation.

15. A color conversion apparatus for performing color conversion, color correction and/or color calibration and/or characterization by transforming a device independent input color space to a device dependent output color space and/or creating a color image based on the device dependent color space, the apparatus comprising:
a color conversion component that converts input color values in the device independent input color space to output color values in the device dependent output color space, the color conversion component (1) computing a transform matrix for the device independent input color space, (2) applying an optimization for at least one of a color conversion, color correction or color calibration or characterization by minimizing an objective function, and (3) calculating a plurality of sampling grid points within the input color space using a set of lower and upper bounds associated with the transform matrix, the sampling grid points substantially fitting a printer gamut and having substantially uniform spacing between the sampling grid points;
a storage device coupled to the color conversion component that stores a lookup table, the lookup table providing color values in the device dependent output color space indexed by the plurality of sampling grid points in the device independent input color space, the sampling grid points substantially fitting the printer gamut and having substantially uniform spacing between the sampling grid points; and
an output device coupled to the color conversion component, the output device having the printer gamut, the output device receiving the output color values and producing a color image.

16. The color conversion apparatus of claim 15, further comprising:
a color calibration and/or characterization component coupled to the output device and the color conversion component, the color calibration and/or characterization component generating or updating the lookup table.

17. The color conversion apparatus of claim 15, wherein the color conversion component optimizes by simple calculation.

18. The color conversion apparatus of claim 15, wherein the color conversion component iteratively achieves optimization.

19. The color conversion apparatus of claim 15, further comprising:
a color correction component coupled to the output device and the color conversion component, the color correction component inverting a colorimetric characterization of the output device and calculating an interpolation error.

* * * * *